United States Patent
Marinier et al.

(10) Patent No.: US 8,867,487 B2
(45) Date of Patent: *Oct. 21, 2014

(54) WIRELESS COMMUNICATION METHODS AND COMPONENTS THAT IMPLEMENT HANDOFF IN WIRELESS LOCAL AREA NETWORKS

(75) Inventors: Paul Marinier, Brossard (CA); Vincent Roy, Longueil (CA); Christopher Cave, Montreal (CA); Frank LaSita, East Setauket, NY (US); Angelo Cuffaro, Laval (CA); Athmane Touag, Laval (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/242,464

(22) Filed: Sep. 23, 2011

(65) Prior Publication Data

US 2012/0014353 A1 Jan. 19, 2012

Related U.S. Application Data

(63) Continuation of application No. 12/759,525, filed on Apr. 13, 2010, now Pat. No. 8,027,312, which is a continuation of application No. 11/018,182, filed on Dec. 21, 2004, now Pat. No. 7,706,326.

(60) Provisional application No. 60/608,768, filed on Sep. 10, 2004.

(51) Int. Cl.
*H04W 4/00* (2009.01)
*H04W 36/06* (2009.01)
*H04W 28/18* (2009.01)
*H04W 84/12* (2009.01)

(52) U.S. Cl.
CPC .............. *H04W 36/06* (2013.01); *H04W 28/18* (2013.01); *H04W 84/12* (2013.01)
USPC ............ 370/331; 455/436; 455/437; 455/438

(58) Field of Classification Search
USPC .................................... 455/437–443; 370/331
See application file for complete search history.

(56) References Cited

U.S. PATENT DOCUMENTS 5,175,867 A * 12/1992 Wejke et al. .................. 455/439
5,732,347 A   3/1998 Bartle et al.
(Continued)

FOREIGN PATENT DOCUMENTS

EP   1 098 540   5/2001
EP   1 345 370   9/2003
(Continued)

OTHER PUBLICATIONS

Huang et al. "A Receiver-Initiated Load Balancing Method in Computer Networks Using Fuzzy Logic Control".

(Continued)

*Primary Examiner* — Charles Shedrick
(74) *Attorney, Agent, or Firm* — Volpe and Koenig, P.C.

(57) ABSTRACT

This invention relates to wireless local area networks, and particularly to the IEEE 802.11 family of standards. It consists of a method and apparatus that can be implemented in access points (APs) and subscriber wireless transmit/receive units (WTRUs), in order to allow an AP to initiate re-association of a WTRU to itself or a different AP. The invention improves the robustness of the network by enabling more efficient load balancing, congestion control, and roaming, without compromising the user experience.

25 Claims, 4 Drawing Sheets

(56) References Cited

U.S. PATENT DOCUMENTS

| | | | |
|---|---|---|---|
| 6,091,953 | A | 7/2000 | Ho et al. |
| 6,360,264 | B1 | 3/2002 | Rom |
| 6,580,700 | B1 | 6/2003 | Pinard et al. |
| 6,824,684 | B2 | 11/2004 | Yamasaki et al. |
| 6,952,411 | B2 | 10/2005 | Sinnarajah et al. |
| 7,336,952 | B2 | 2/2008 | Leung |
| 7,613,460 | B2 | 11/2009 | Matsui et al. |
| 2002/0118664 | A1 | 8/2002 | Ishibashi et al. |
| 2002/0131371 | A1 | 9/2002 | Rudnick |
| 2002/0141371 | A1 | 10/2002 | Hsu |
| 2002/0142771 | A1 | 10/2002 | Saiffulah et al. |
| 2002/0142772 | A1 | 10/2002 | Hunzinger |
| 2003/0063593 | A1 | 4/2003 | Koyanagi |
| 2003/0134642 | A1 | 7/2003 | Kostic et al. |
| 2003/0156558 | A1 | 8/2003 | Cromer et al. |
| 2003/0185172 | A1 | 10/2003 | Rue |
| 2004/0001467 | A1 | 1/2004 | Cromer et al. |
| 2004/0023669 | A1* | 2/2004 | Reddy ................. 455/456.1 |
| 2004/0054774 | A1* | 3/2004 | Barber et al. ............ 709/224 |
| 2004/0066759 | A1 | 4/2004 | Molteni et al. |
| 2004/0076136 | A1 | 4/2004 | Beach |
| 2004/0121772 | A1 | 6/2004 | Rue |
| 2004/0203781 | A1 | 10/2004 | Lefkowitz |
| 2004/0224690 | A1 | 11/2004 | Choi et al. |
| 2005/0013276 | A1 | 1/2005 | Ekl et al. |
| 2005/0090259 | A1 | 4/2005 | Jain et al. |
| 2005/0141498 | A1 | 6/2005 | Cam Winget et al. |
| 2005/0272380 | A1 | 12/2005 | Stacey |
| 2006/0227731 | A1 | 10/2006 | Shun et al. |
| 2007/0053362 | A1 | 3/2007 | Garg |

FOREIGN PATENT DOCUMENTS

| | | |
|---|---|---|
| GB | 2409377 | 6/2005 |
| JP | 8307947 A2 | 11/1996 |
| JP | 2003324442 A2 | 11/2003 |
| KR | 2002-0023918 | 3/2002 |
| WO | 00/18174 | 3/2000 |
| WO | 03058887 A1 | 7/2003 |
| WO | 2005/013560 | 2/2005 |

OTHER PUBLICATIONS

IEEE Wireless LAN Edition, A Compilation Based on IEEE Std. 802.11—1999 (R2003) and Its Amendments.

802.11h, IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 5: Spectrum and Transmit Power Management Extensions in the 5 GHz Band in Europe, Oct. 14, 2003.

ANSI/IEEE Std 802.11, 1999 Edition, Information Technology—Telecommunications and Information Exchange Between Systems—Local and Metropolitan Area Networks—Specific Requirements—Part 11: Wireless LAN Medium Access Control (MAC) and Physical Layer (PHY) Specifications.

Huang et al. "A Receiver-Initiated Load Balancing Method in Computer Networks Using Fuzzy Logic Control," IEEE Global Telecommunications Conference, vol. 7, pp. 4028-4033 (Dec. 1-5, 2003).

* cited by examiner

WIRELESS COMMUNICATION METHODS AND COMPONENTS THAT IMPLEMENT HANDOFF IN WIRELESS LOCAL AREA NETWORKS

CROSS REFERENCE TO RELATED APPLICATION(S)

This application is a continuation of U.S. patent application Ser. No. 12/759,525, filed on Apr. 13, 2010, which is a continuation of U.S. patent application Ser. No. 11/018,182, filed Dec. 21, 2004, which claims priority from U.S. Provisional Patent U.S. Provisional Patent Application No. 60/608,768, filed Sep. 10, 2004, each of which is incorporated by reference as if fully set forth herein.

FIELD OF INVENTION

The present invention relates to wireless local area networks (WLANs) and to methods and apparatus that facilitate a wireless transmit/receive unit (WTRU) to "roam" by switching from communication via one communication station to another. In particular, the invention is advantageously employed by WTRUs configured to operate in WLANs compliant with the IEEE 802 standards where the WTRUs are able to conduct wireless communications with WLAN access points (APs) and to continue a wireless communication while switching from a wireless link with one AP to a wireless link with another AP.

BACKGROUND

Wireless communication systems are well known in the art. Generally, such systems comprise communication stations, which transmit and receive wireless communication signals between each other. Depending upon the type of system, communication stations typically are one of two types of wireless transmit/receive units (WTRUs): one type is the base station, the other is the subscriber unit, which may be mobile.

The term base station as used herein includes, but is not limited to, a base station, access point, Node B, site controller, or other interfacing device or WTRU in a wireless environment, that provides other WTRUs with wireless access to a network with which the AP is associated.

The term wireless transmit/receive units (WTRU) as used herein includes, but is not limited to, a user equipment, mobile station, fixed or mobile subscriber unit, pager, or any other type of device capable of operating in a wireless environment. Such WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units.

Typically, a network of base stations is provided wherein each base station is capable of conducting concurrent wireless communications with appropriately configured WTRUs, as well as multiple appropriately configured base stations. Some WTRUs may alternatively be configured to conduct wireless communications directly between each other, i.e., without being relayed through a network via a base station. This is commonly called peer-to-peer wireless communications. Where a WTRU is configured to communicate directly with other WTRUs it may itself also be configured as and function as a base station. WTRUs can be configured for use in multiple networks, with both network and peer-to-peer communications capabilities.

One type of wireless system, called a wireless local area network (WLAN), can be configured to conduct wireless communications with WTRUs equipped with WLAN modems that are also able to conduct peer-to-peer communications with similarly equipped WTRUs. Currently, WLAN modems are being integrated into many traditional communicating and computing devices by manufacturers. For example, cellular phones, personal digital assistants, and laptop computers are being built with one or more WLAN modems.

Popular WLAN environments with one or more WLAN base stations, typically called access points (APs), include those constructed according to one or more of the IEEE 802 family of standards. Access to these networks usually requires user authentication procedures. Protocols for such systems are presently being standardized in the WLAN technology area. One such framework of protocols is represented by the IEEE 802 family of standards.

A basic service set (BSS) is the basic building block of an IEEE 802.11 WLAN, which comprises WTRUs also referred to as stations (STAs). A set of STAs which can talk to each other can form a BSS. Multiple BSSs are interconnected through an architectural component called a distribution system (DS), to form an extended service set (ESS). An access point (AP) is a WTRU that provides access to the DS by providing DS services, and generally allows concurrent access to the DS by multiple STAs.

A network of WTRUs operating with peer to peer communications in an IEEE 802.11 environment, typically referred to as "ad hoc" mode, is also called an "independent BSS." In an independent BSS, two or more WTRUs establish communication among themselves without the need of a coordinating network element. No AP-to-network infrastructure is required. However, an AP can be configured to use the ad hoc protocols and act as the WTRUs do in peer to peer communications. In such case an AP may act as a bridge or router to another network or to the Internet.

A WTRU that starts an ad hoc network selects the ad hoc network's operating parameters, such as the service set identifier (SSID), channel, and beacon timing, and transmits this information in communication frames, for example, in beacon frames. As other WTRUs join the ad hoc network, they detect and use the ad hoc network's operating parameters.

Where a network infrastructure is used and wireless communications are controlled through APs, parameters such as the SSID are normally specified by a network controller associated with the APs. The APs periodically broadcast beacon frames to enable WTRUs to identify the APs and attempt to establish communications with them.

The SSID in an IEEE 802 based system can be a 32-character unique identifier attached to a header of packets sent over a WLAN. The SSID then acts as a password when a WTRU attempts to connect to a BSS or an independent BSS. The SSID differentiates one WLAN from another, so all base stations and all other devices connected to or attempting to connect to a specific WLAN normally use the same SSID. A device will not normally be permitted to join a BSS unless it can provide the correct SSID.

In an AP-based WLAN, a mobile WTRU communicates wirelessly with a specific AP when in the geographic service area of that AP. The WTRU is said to be associated with the AP through which it is conducting wireless communications. It is sometimes necessary or desirable for a WTRU to change the AP with which it is associated. For example, the WTRU may be experiencing poor signal conditions because it is moving out of the geographic area served by the AP with which it is associated. The need to associate to another AP can also be caused by congestion arising in the basic service set (BSS) served by that AP. Re-association is also referred to as roaming, particularly if the WTRU has an assigned "home" AP (or network of APs) and then "roams" when the WTRU communicates via a different AP (or different network's AP).

In WLANs compliant with the current 802.11 standards, the re-association of a WTRU to a new AP is initiated entirely by the WTRU. To accomplish this, a WTRU must first identify APs in its vicinity that can potentially provide network services to the WTRU. This is conventionally achieved by a scanning process, which may be active or passive.

In active scanning, the WTRU transmits probe requests on one or more channels on which the WTRU is configured to communicate. The WTRU selects a new AP from among the APs from which it receives probe responses. In passive scanning, the WTRU dwells on the channels it can use in an attempt to receive beacon packets transmitted by APs which serve the geographic location where the WTRU is then located. The WTRU then selects a new AP from among the APs from which it receives beacon packets. Both active and passive scanning can take a significant amount of time in terms of being able to maintain an ongoing communication, particularly when the WTRU is moving.

The inventors have recognized that it is sometimes desirable that an AP take the initiative of reassociating a WTRU. For example, APs (or some other node controlling the WTRU's behavior) may determine a current "load" condition based on the collective volume of wireless communication traffic due to the number of WTRUs associated with the AP an/or the types of communications being conducted. Also a WTRU may be located at location served by several neighboring APs each of which may be using a different channel from among the set of channels over which the WTRU can communicate. Where the collective traffic volume is relatively high (heavy load) for one AP and the volume of traffic on one or more neighboring APs is relatively low (light load), it would be desirable that one or more WTRUs associated with the heavily loaded AP re-associate with a neighboring lightly loaded AP.

In WLANs compliant with the current 802.11 standards, however, these re-associations take place only if WTRUs associated with the heavily loaded AP are equipped with a sophisticated algorithm allowing them to autonomously decide re-association to another available AP is desirable, based on traffic estimations on the channels. It is difficult to be certain that all WTRUs would be equipped with such an algorithm, and the design and implementation of such an algorithm can be quite complex. Even if all WTRUs operating in a given geographical area are equipped with such an algorithm, it is difficult to guarantee that the WTRUs would not re-associate to other APs in a disorderly fashion, possibly resulting in multiple re-associations taking place back and forth between the same APs.

To avoid these issues, the inventors have considered potential solutions. For example, a heavily loaded AP could forcefully disassociate some selected WTRUs, hoping that these WTRUs would then find another AP with which they can re-associate. It could also induce disassociations indirectly by reducing the transmission power level of certain key packets it transmits, for example, beacon or probe response packets. The problem with these disassociation techniques is that they can result in a disruption of service unacceptable to certain WTRU users, for example, users of real-time services such as voice or video. This disruption is caused by the WTRU having to scan for a new AP after disassociation, a process which can take a significant amount of time. In consideration of the overall problems, the inventors have recognized it would be desirable to provide for allowing an AP to initiate the re-association of a WTRU from one AP to another without loss of performance.

SUMMARY

A communication method, system and components are provided that includes a hand-shaking procedure allowing a WTRU communicating with a network station via a first set of communication parameters, to handoff to another network station for communication via a second set of communication parameters. Preferably, an original access point (AP) of a wireless local area network (WLAN) requests or commands the WTRU to handoff to a target AP. As an alternative, a target AP of a WLAN can request or command the WTRU to hand-off to the target AP from an original AP with which the WTRU is communicating.

Preferably, in an IEEE 802 type WLAN context, four distinct scenarios are provided for, which may be implemented individually or in combination for a particular WLAN, namely:

1. An original AP requests a WTRU to handoff to a target AP. The WTRU then decides whether to handoff or not, and communicates its decision to the original AP. In the case where the WTRU decides to go forward with the handoff, the WTRU reconfigures its channel, BSSID, etc. for the target AP, and sends to the target AP a confirmation message indicating that it has completed the re-association.

2. An original AP commands a WTRU to handoff to a target AP. The WTRU then reconfigures its channel, BSSID, etc. for the target AP, and sends to the target AP a confirmation message indicating that it has completed the re-association.

3. A target AP commands a WTRU to handoff to the target AP. The WTRU then notifies an original AP with which it is communicating of its imminent handoff, reconfigures its channel, BSSID, etc. for the target AP, and sends to the target AP a confirmation message indicating that it has completed the re-association.

4. A target AP requests the WTRU to handoff to the target AP. The WTRU decides whether to handoff or not, and communicates its decision to the target AP. In the case where the WTRU decides to go forward with the handoff, the WTRU notifies an original AP with which it is communicating of its imminent handoff, reconfigures its channel, BSSID, etc. for the target AP, and sends to the target AP a confirmation message indicating that it has completed the re-association.

A more detailed understanding of the invention may be had from the following description of a preferred embodiment, given by way of example, and to be understood in conjunction with the accompanying drawings, wherein like elements are designated by like numerals.

BRIEF DESCRIPTION OF THE DRAWING(S)

TABLE OF ACRONYMS

Figure 1:
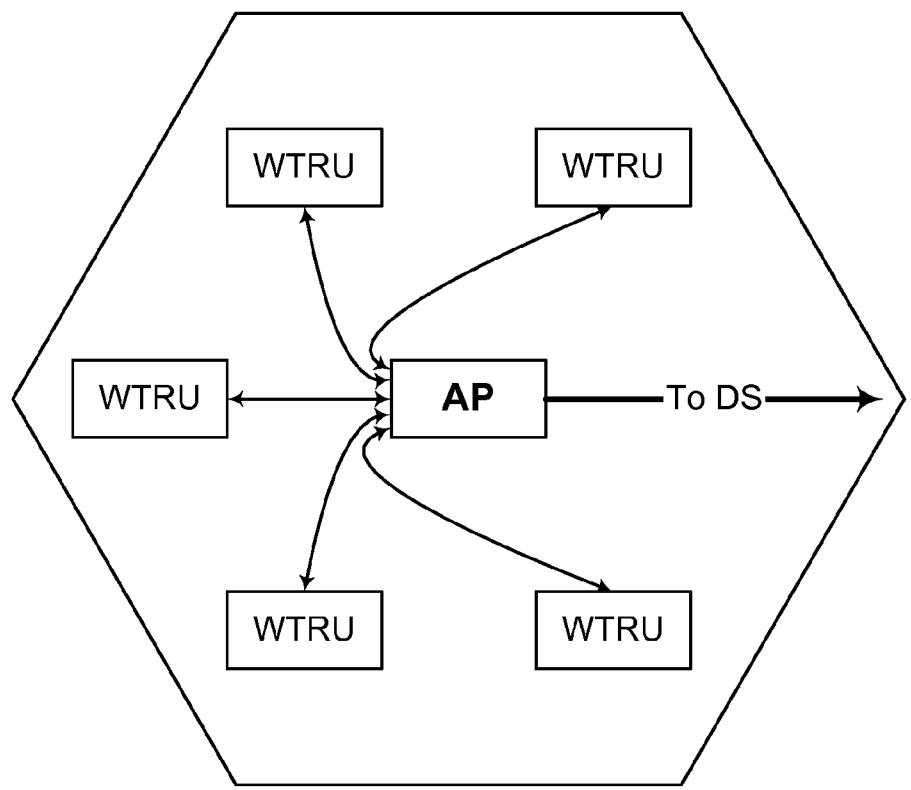
FIG. 1 is a system overview diagram illustrating WLAN communication.

| | |
|---|---|
| AP | Access Point |
| BSS | Base Station System |
| BSSID | Base Station System Identifier |
| DRI | Directed Re-association Indication |
| DRCf | Directed Re-association Confirmation |
| DRCm | Directed Re-association Command |
| DRRq | Directed Re-association Request |
| DRRsp | Directed Re-association Response |
| DS | Distribution System |
| ESS | Extended Service Set |
| PDA | Personal Digital Assistant |
| STA | Station |
| WLAN | Wireless Local Area Network |
| WTRU | Wireless Transmitter/Receiver Unit |

DETAILED DESCRIPTION OF PREFERRED EMBODIMENT(S)

The terms access point (AP), original AP, target AP, and wireless transmit/receive unit (WTRU) are used as described above. The present invention provides a wireless radio access network having a plurality of networked APs through which wireless network services are provided for one or more WTRUs. The invention is particularly useful when used in conjunction with mobile WTRUs, as they travel across the respective geographic areas of service coverage provided by respective APs. The WTRUs can have an integrated or installed wireless WLAN device, such as 802.11(a), 802.11(b), 802.11(g) or 802.11(n) compliant device, in order to communicate. However, the invention is applicable in any wireless system.

The term directed re-association request (DRRq) means a signal directed to a WTRU requesting the WTRU reconfigure itself for communication with a different network station such as a target AP. In a WLAN IEEE 802.11 context, the DRRq can be sent by either the original AP or the target AP.

The information contained in the DRRq preferably includes data sufficient to identify a target AP and to enable the WTRU to communicate with the target AP. This information preferably includes the channel of the target AP, an identifier of the target AP (MAC address, IP address, etc.), the target BSSID, the target AP capabilities, etc. The DRRq preferably also includes timing information as to when handoff is scheduled. A flag or special value for a timing field can be used to indicate that handoff is meant to be immediate. The DRRq can also include signaling-specific information such as which signaling steps are needed in the exchange. For example, the DRRq can indicate if the target AP expects to receive a directed re-association confirmation, or if the original AP expects to receive a directed re-association indication.

In the case where a DRRq is sent from a target AP, the target AP preferably uses the same channel to send the DRRq to the WTRU as is being used by the WTRU and an original AP with which the WTRU is communicating. In a preferred embodiment, the DRRq is implemented as a unicast frame, more specifically as a control frame, as a management frame or as the payload of a data frame. In alternative embodiments, this signaling can also be implemented using a multicast or broadcast message.

The term directed re-association response (DRRsp) means a signal, from the WTRU to which the DRRq was sent, directed to the network station which sent the DRRq. The DRRsp preferably indicates whether the WTRU accepts or rejects the request to reconfigure itself for communication with a different network station such as a target AP.

The term directed re-association command (DRCm) means a signal from a network station directed to a WTRU, commanding the WTRU to reconfigure itself for communication with a different network station such as a target AP. In the IEEE 802.11 context, the DRCm can be sent by either an original AP or a target AP. The WTRU is expected to follow the DRCm and thus need not send a DRRsp to the network station that sent the DRCm. The DRCm preferably contains the same target AP information as described above for the DRRq.

In the case where the DRCm is sent from a target AP, the target AP preferably uses the same channel to send the DRCm to the WTRU as is being used by the WTRU and an original AP with which the WTRU is communicating. In a preferred embodiment, the DRCm is implemented as a unicast frame, more specifically as a control frame, as a management frame or as the payload of a data frame. In alternative embodiments, this signaling can also be implemented using a multicast or broadcast message.

The term directed re-association confirmation (DRCf) means a signal from a WTRU to a network station such as a target AP after the WTRU has reconfigured itself to communicate with that station. The DRCf confirms that the WTRU has reconfigured itself. The DRCf is used to prevent the undesirable scenario in which a target AP starts sending packets to the WTRU before the WTRU has successfully re-associated to the target AP. This can result in a target AP needlessly transmitting and retransmitting frames to a WTRU that was expected to reconfigure itself to the target AP, but did not do so. In such a case, the number of frames buffered in the target AP could be substantial, and could lead to a reduction in the efficiency of the wireless medium due to the exponentially increasing back off window associated with multiple retransmissions. Also, if a target AP does not receive a DRCf indicating that re-association was successful within a desired time out period, the target AP can eventually release any radio resources that it may have reserved for the WTRU.

The information contained in a DRCf preferably includes data sufficient to identify an original AP with which the WTRU is communicating, a target AP, and the WTRU. In an IEEE 802.11 context, the DRCf preferably includes indications of the communication channels, identifiers (MAC addresses, IP addresses, etc.), and BSSIDs used by each, and the capabilities of the target and original APs. The DRCf may also include timing information as to when handoff occurred. In a preferred embodiment, the DRCf is implemented as a unicast frame, more specifically as a control frame, a management frame or as payload of a data frame. In alternative embodiments, this signaling can also be implemented using a multicast or broadcast message.

The term directed re-association indication (DRI) means a signal from a WTRU to a network station with which the WTRU had been in communication, such as an original AP, after the WTRU has been requested or commanded by another station, such as a target AP, to reconfigure itself and the WTRU is proceeding to do so. The DRI is preferably used to indicate to an original AP that the WTRU will reconfigure itself to a target AP. The DRI allows an original AP to stop transmitting packets to the WTRU (which would result in inefficient use of the wireless medium) and to forward any buffered packets to the target AP. The DRI also allows an original AP to release any radio resources that it may have reserved for the WTRU.

In an IEEE 802.11 context, the information contained in the DRI preferably includes the channel of the target AP, an identifier of the target AP (MAC address, IP address, etc.), the target BSSID, the target AP capabilities, etc. The DRI can also include timing information as to when handoff is scheduled. A flag or special value for a timing field can be used to indicate that the handoff is meant to be immediate. In a preferred embodiment, the DRI is implemented as a unicast frame, more specifically as a control frame, a management frame or as payload of a data frame. In alternative embodiments, this signaling could also be implemented using a multicast or broadcast message.

Referring to FIG. 1, a WLAN is illustrated in which WTRUs conduct wireless communications via a network station, in this case an AP. The AP is connected with a DS. The AP is shown as conducting communications with five WTRUs. Such a configuration is also called a basic service set (BSS) within WLAN contexts. Generally, the WLAN system supports WTRUs with different data rates. In some cases an AP is configured to support multiple types of WTRUs, such as 802.11(b) and 802.11(g) compliant WTRUs.

Figure 2:
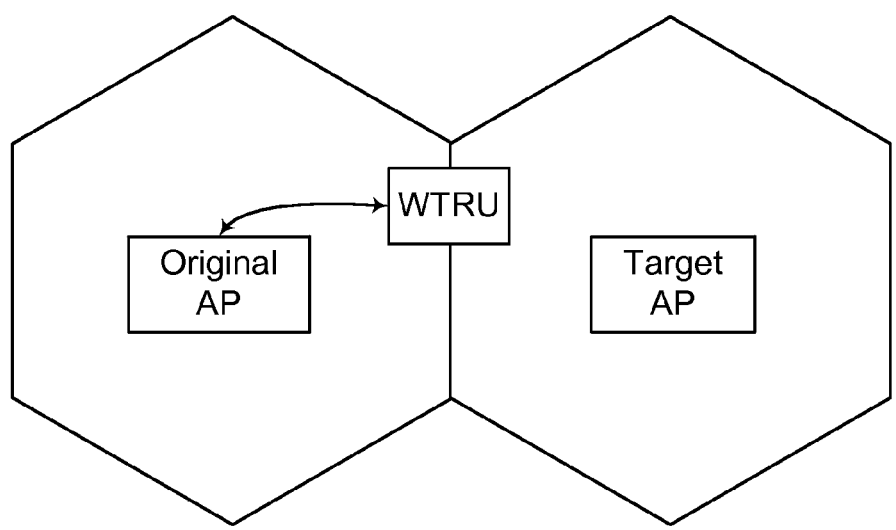
FIG. 2 is a diagram showing an overview of a system in accordance with the present invention, in which a mobile WTRU is exiting the service area of an original AP and is entering the service area of a target AP.

Referring to FIG. 2, a WLAN is illustrated having two APs, denoted original and target. A WTRU is shown conducting wireless communications via the original AP. The WTRU is disposed in an area served by both the original AP and the target AP so that it is possible for the WTRU to "hand off" its communication from via the original AP to the target AP.

Conventionally in an IEEE 802.11 WLAN, the WTRU will initiate a handover operation from the original AP to the target AP when, for example, the WTRU begins to move further away from the original AP and towards the target AP. For such WTRU initiated handover, the handover operation must be complete before the WTRU is out of range of the original AP in order to avoid interruption of an ongoing wireless communication being conducted by the WTRU.

In accordance with the present invention, the WLAN is provided with further functionality by permitting the APs to also decide if and when handoff should occur. This functionality permits the WLAN to address congestion issues arising due to differing traffic in the respective cells or services areas of the respective APs. This is beneficial to improve the robustness of the network by enabling efficient load balancing and congestion control algorithms without compromising the user experience. It also enables more efficient roaming. Depending on the implementation of the invention, the original AP and/or the target AP can request and/or command the WTRU to handoff to the target AP. Preferably, in an IEEE 802 type WLAN context four distinct scenarios are provided for, which may be implemented individually or in combination for a particular WLAN.

Figure 3:
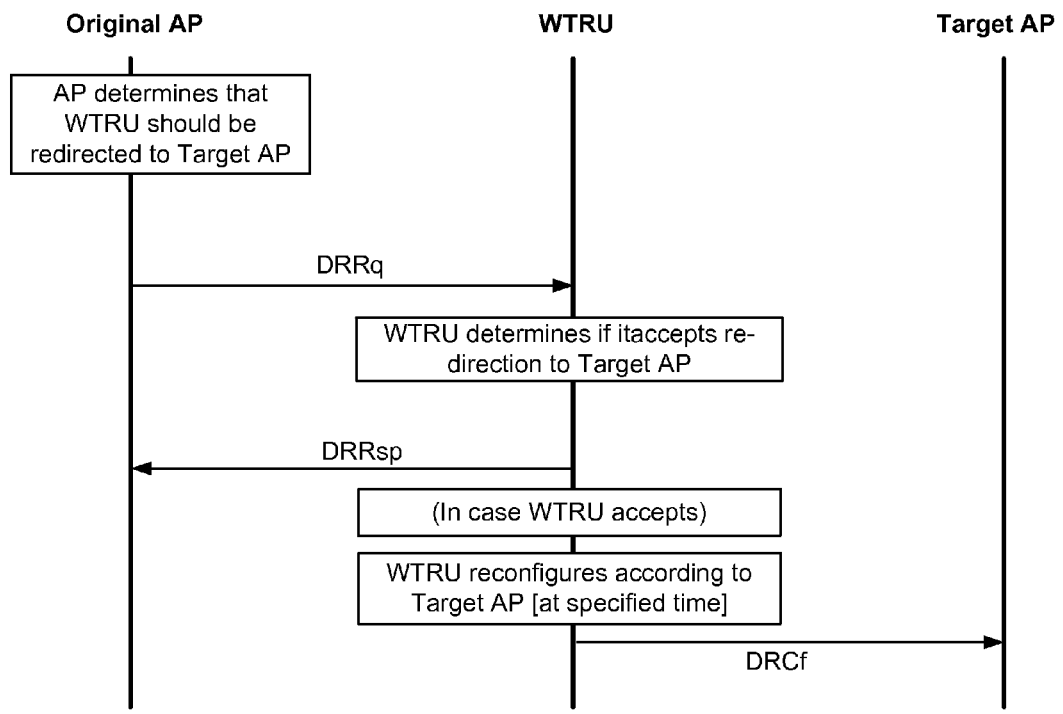
FIG. 3 is a diagram showing the signaling exchange for a first scenario in which an original AP requests a WTRU to handoff to a target AP.

Referring to FIG. 3, a first scenario is depicted where the original AP requests the WTRU to handoff to the target AP. The WTRU then decides whether to handoff or not, and communicates its decision to the original AP. In the case where the WTRU decides to go forward with the handoff, the WTRU then reconfigures its channel, BSSID, etc. for the target AP, and sends to the target AP a confirmation message indicating that it has completed the re-association. The reconfiguration process itself is preferably essentially the same as for a conventional WTRU initiated handover, but one of the APs preferably provides the reconfiguration data concerning the target AP in DRRq messaging.

As a first step, the original AP determines that the WTRU should be redirected to a target AP. This decision can be based on the type and amount of communication traffic the original AP is conducting in comparison with the target AP. The original AP then sends a DRRq to the WTRU requesting that the WTRU handoff to the target AP. The WTRU determines if it accepts the redirection request, and communicates its decision to the original AP via a DRRsp. This option permits, for example, the WTRU to determine if a desired Quality of Service is available from the target AP. In the case where the WTRU accepts the request to handoff to the target AP, the WTRU reconfigures itself to the target AP, and sends to the target AP a DRCf, confirming that it has handed off.

Figure 4:
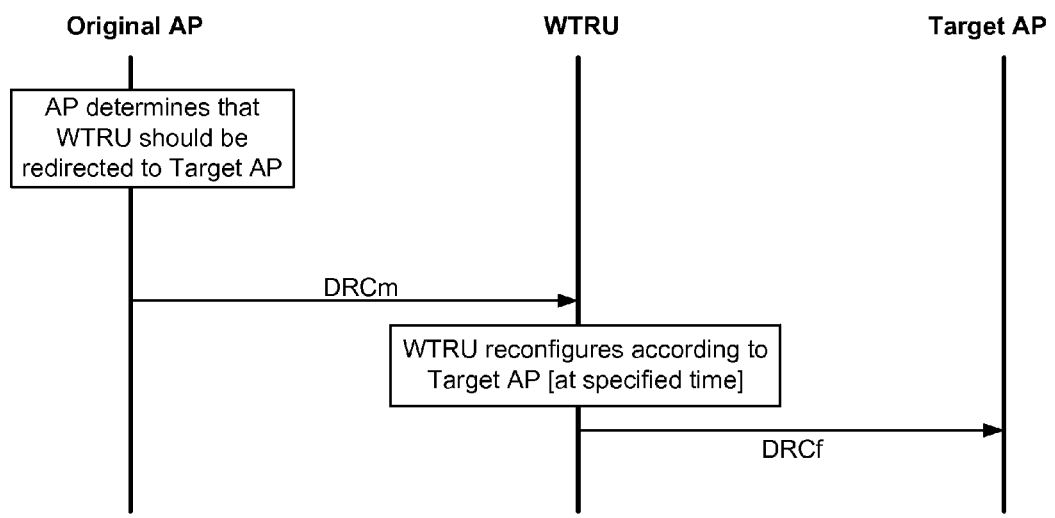
FIG. 4 is diagram showing the signaling exchange for a second scenario in which an original AP commands a WTRU to handoff to a target AP.

Referring to FIG. 4, a second scenario is depicted where the original AP commands a WTRU to handoff to a target AP. Based on this command, the WTRU reconfigures its channel, BSSID, etc. for the target AP, and sends to the target AP a confirmation message indicating that it has completed the re-association.

In this scenario, when the original AP determines that the WTRU should be redirected to a target AP, it sends to the WTRU a DRCm commanding that it handoff to the target AP. The WTRU reconfigures itself to the target AP, and sends to the target AP a DRCf. Where DRCm messaging is used, it is preferred that the WLAN make a determination that a desired Quality of Service is available from the target AP before issuing such a command. Such a determination can be based upon geolocation information of the WTRU either obtained from the WTRU via signaling or calculated by the WLAN based on signals or measurement reports received from the WTRU.

Figure 5:
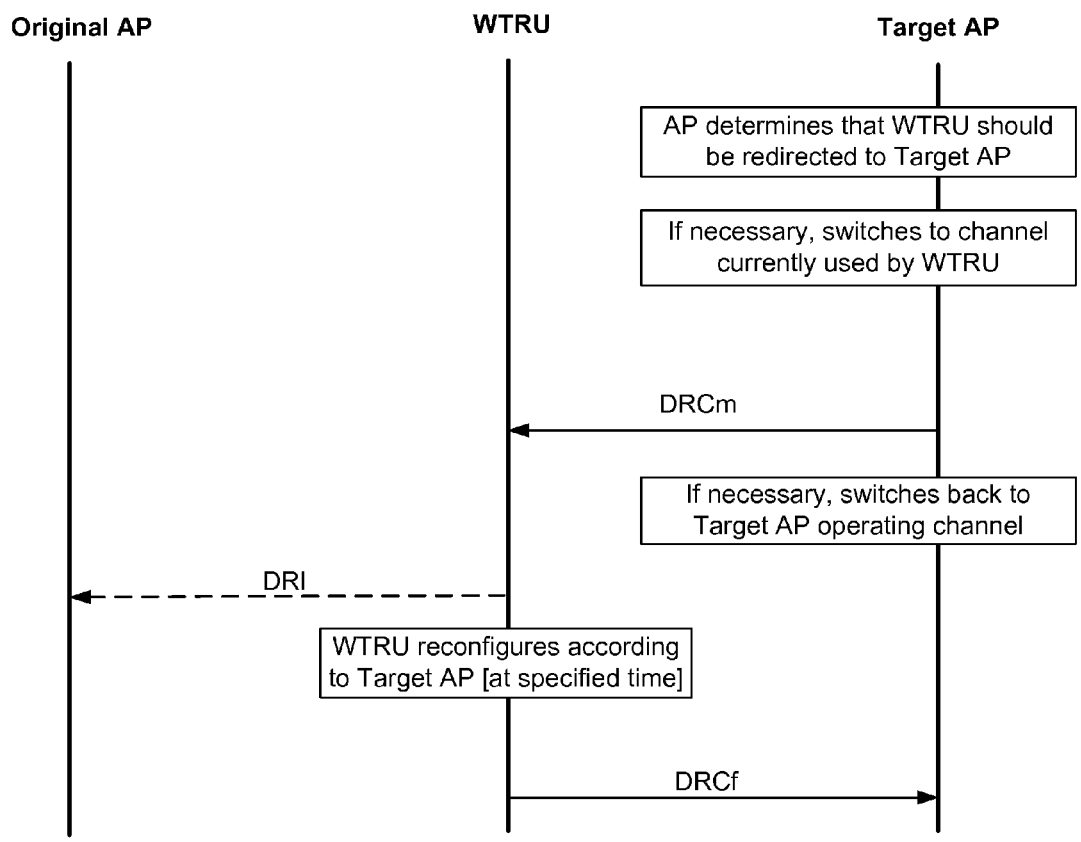
FIG. 5 is a diagram showing the signaling exchange for a third scenario in which a target AP commands a WTRU to handoff to a target AP.

Referring to FIG. 5, a third scenario is depicted where the target AP commands a WTRU to handoff to the target AP. The WTRU then notifies an original AP with which it is communicating of its imminent handoff, reconfigures its channel, BSSID, etc. for the target AP, and sends to the target AP a confirmation message indicating that it has completed the re-association.

In this scenario, the target AP preferably determines that the WTRU should be redirected to the target AP. The target AP can, for example, be configured to make a determination that a desired Quality of Service is available from the target AP before issuing such a command based on intercepting signals from the WTRU that are directed to the original AP or based on the target AP obtaining measurements reports from the original AP through inter-AP signaling. Intercepting signals from the WTRU may not be effective if the WTRU is using a directional antenna for its signaling to the original AP. The target AP sends to the WTRU a DRCm commanding that the WTRU handoff to the target AP. Preferably, the target AP uses the channel currently used by the WTRU in communicating via the original AP for sending the DRCm. After sending the DRCm, further communication between the target AP and the WTRU is then preferably on the target AP's operating channel. The WTRU sends to the original AP a DRI communicating that it will reconfigure to the target AP. The WTRU then reconfigures itself to the target AP, and sends to the target AP a DRCf, confirming that it has handed off.

Figure 6:
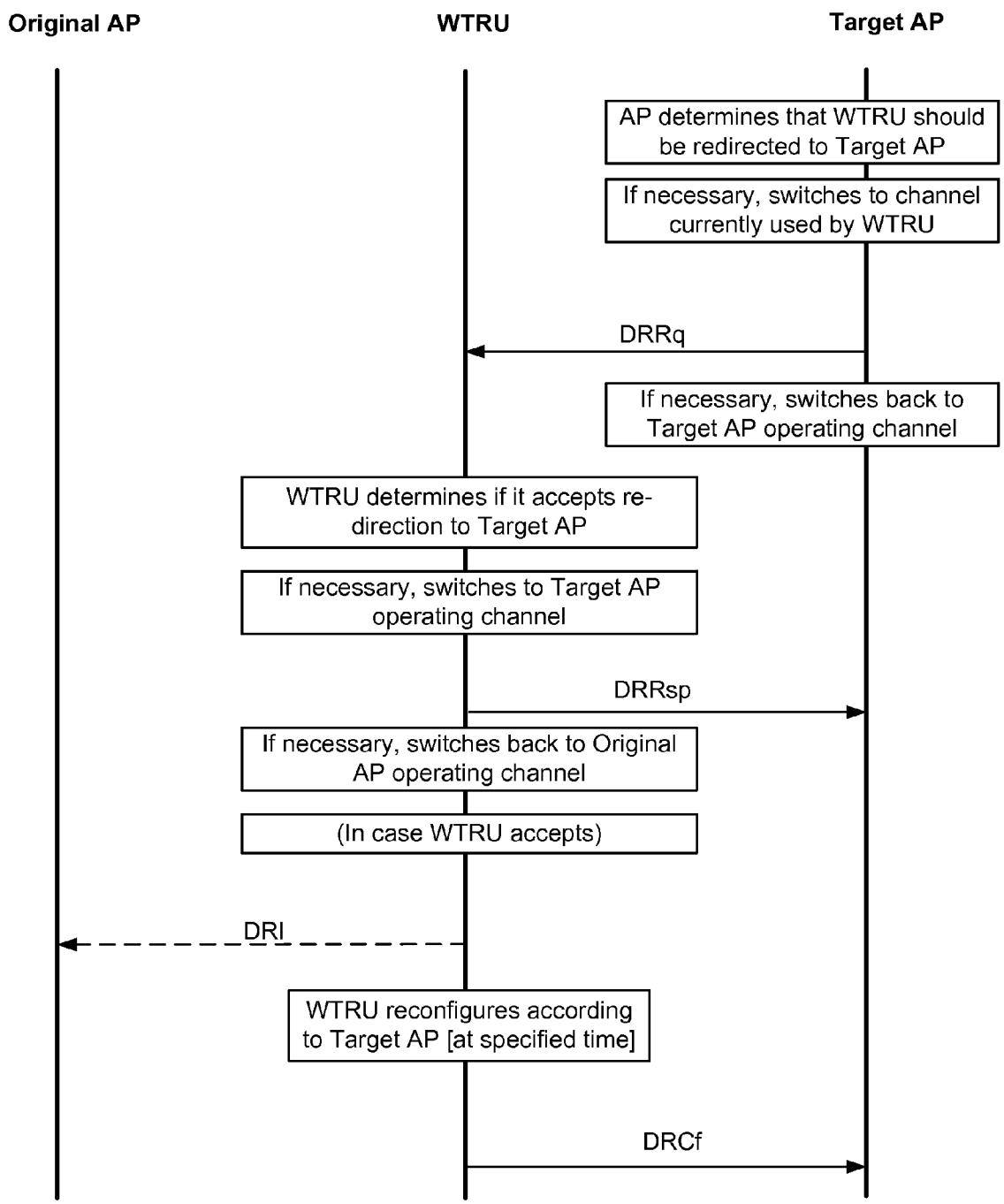
FIG. 6 is a diagram showing the signaling exchange for a fourth scenario in which a target AP requests a WTRU to handoff to a target AP.

Referring to FIG. 6, a fourth scenario is depicted where the target AP requests the WTRU to handoff to the target AP. The WTRU decides whether to handoff or not, and communicates its decision to the target AP. In the case where the WTRU decides to go forward with the handoff, the WTRU notifies the original AP with which it is communicating of its imminent handoff, reconfigures its channel, BSSID, etc. for the target AP, and sends to the target AP a confirmation message indicating that it has completed the re-association.

In this fourth scenario, the target AP determines that the WTRU should be redirected to the target AP. Preferably, the target AP uses the channel being used by the WTRU in communicating with the original AP to send to the WTRU a DRRq requesting that the WTRU handoff to the target AP. The target AP subsequently communicates with the WTRU on the target AP's preferred operating channel. The WTRU determines if it accepts the redirection request. It communicates its decision to the target AP via a DRRsp, preferably on the target AP's operating channel. In the case where the WTRU accepts the request to handoff to the target AP, the WTRU sends to the original AP a DRI communicating its decision, preferably on the original channel that had been used in communications with the original AP. The WTRU then reconfigures itself to the target AP, and sends to the target AP a DRCf, confirming that it has handed off.

One alternative in the fourth scenario is to combine the DRRsp with the DRCf (or treat the DRCf as the DRRsp) where the WTRU determines to accept the redirection request from the target AP. This alternative eliminates the need for the WTRU to switch between communication parameters multiple times during handover. This alternative implies that either the origin AP or the target AP are using the same channel or that, after sending the DRRq, the target AP remains on the origin AP channel until it received the DRCf.

The method by which the AP driving the handoff procedure determines which AP is a suitable or desired candidate to be the target AP can include, for example, the WTRU reporting a list of candidate APs, inter-AP signaling, centralized decision-making performed at a central controller, or any other suitable method.

In implementation, a preferred WTRU includes a transceiver and a processor selectively configured to implement handoff of wireless communication from via a first access point (AP) using a first set of communication parameters to via a second AP using a second set of communication parameters based on AP initiated messaging. The transceiver is preferably configured to receive a re-association message using the first set of communication parameters, which identifies the second AP and second set of communication parameters. The processor is operatively associated with the transceiver and is preferably configured to selectively reconfigure the transceiver to communicate via the second set of communication parameters in response to a received re-association message such that the transceiver is enabled to transmit a reconfiguration confirmation to the second AP using the second set of communication parameters. Preferably, the WTRU is configured to operate in an IEEE 802.11 compliant system so that the transceiver is configured to communicate in a predetermined frame format. A re-association message from the first AP is then preferably received in a directed re-association command frame and the reconfiguration confirmation to the second AP is transmitted in a directed re-association confirmation frame.

The WTRU wherein the processor can be configured to direct the transceiver to transmit to the first AP a re-association indication message in connection with processing a received re-association message which is a re-association command sent by the second AP before reconfiguring the transceiver to communicate via the second set of communication parameters. Where the WTRU is configured to operate in an IEEE 802.11 compliant system using a predetermined frame format, the processor is preferably configured to direct the transceiver to receive a re-association message from the second AP in a directed re-association command frame, to transmit the re-association indication to the first AP in a directed re-association indication frame, and to transmit the reconfiguration confirmation to the second AP in a directed re-association confirmation frame.

The WTRU processor can be configured to make a decision regarding reconfiguration to communicate via the second set of communication parameters in response to a received re-association request. In such case the processor is preferably configured to direct the transceiver to transmit the decision to the AP from which the re-association request was received in a directed re-association response message such that the processor directs the transceiver to be reconfigured to communicate via said second set of communication parameters where the decision is to proceed with re-association. Where the WTRU is configured to operate in an IEEE 802.11 compliant system using predetermined frame formats, the processor is preferably configured to direct the transceiver to receive a re-association request in a directed re-association request (DRRq) frame from the first AP, to transmit the decision regarding re-association in a directed re-association response (DRRsp) frame using the first set of communication parameters, and to transmit the reconfiguration confirmation in a directed re-association confirmation (DRCf) frame using the second set of communication parameters.

The WTRU processor can be further configured to direct the transceiver to use the second set of communication parameters to send the directed reconfiguration response message in connection with processing an association request received from the second AP. The processor can also be configured to direct the transceiver to transmit to the first AP a re-association indication using the first set of communication parameters in connection with processing an association request received from the second AP where the decision is to proceed with re-association. Where the WTRU is configured to operate in an IEEE 802.11 compliant system using predetermined frame formats, the processor is preferably configured to direct the transceiver to receive a re-association request in a directed re-association request (DRRq) frame, to transmit the re-association indication in a directed re-association indication (DRI) frame and to transmit the reconfiguration confirmation in a directed re-association confirmation (DRCf) frame. The WTRU processor can then also be configured to direct the transceiver to transmit the decision regarding re-association in a directed re-association response (DRRsp) frame in advance of the DRI frame.

Implementation on the network side is preferably through providing WLAN APs that each include a transceiver and a processor selectively configured to assist in handoff of a wireless communications with such WTRUs to or from via particular APs. The AP transceiver is preferably configured to provide wireless network access for wireless transmit/receive units (WTRUs) using a defined set of communication parameters. The AP processor is preferably configured to make a decision regarding handing off, from or to the AP, of a wireless communication conducted by a WTRU using a pre-handoff set of parameters. The processor is configured to direct the transceiver to transmit a re-association message, when a handoff decision is made, that identifies an AP for handoff and a post-handoff set of communication parameters using the pre-handoff set of communication parameters. The AP's transceiver is preferably configured to receive from a WTRU, that has received a re-association message and is proceeding with handoff, a reconfiguration confirmation where the AP is the AP identified for handoff in the re-association message received by the WTRU.

For implementation of the second scenario above, the AP is preferably configured to operate in an IEEE 802.11 compliant system wherein the transceiver is configured to use a predetermined frame format to transmit re-association messages to WTRUs in directed re-association command frames and to receive reconfiguration confirmations from WTRUs in directed re-association confirmation frames.

The transceiver can be configured to receive from a WTRU, that is conducting a wireless communication via the AP, a re-association indication message indicating a handoff of the communication to via another AP to implement the third scenario. The processor is preferably configured to release resources allocated for the communication in connection with receiving the re-association indication message. Also for implementation of the third scenario, the AP is preferably configured to operate in an IEEE 802.11 compliant system wherein the transceiver is configured to communicate in a predetermined frame format and the processor is configured to direct the transceiver to transmit re-association messages in directed re-association command frames, to receive re-association indications in directed re-association indication frames, and to receive reconfiguration confirmations in directed re-association confirmation frames.

To implement the first scenario, the AP processor is preferably configured to direct the transceiver to transmit a re-association message, when a handoff decision is made, in the form of a received re-association request and the transceiver is configured to receive from WTRUs that have received a re-association request from the AP, a directed re-association response message reflecting a responsive WTRU decision regarding proceeding with re-association. The AP is preferably configured to operate in an IEEE 802.11 compliant system wherein the transceiver is configured to use predetermined frame formats and the processor is configured to direct the transceiver to transmit re-association requests in directed re-association request (DRRq) frames, to receive decisions regarding re-association in directed re-association response (DRRsp) frames, and to receive reconfiguration confirmations in directed re-association confirmation (DRCf) frames.

For the fourth scenario, the AP transceiver is preferably configured to use the post-handoff set of communication parameters to receive a directed reconfiguration response message where the AP processor has directed the transceiver to transmit a re-association message using a pre-handoff set of communication parameters to a WTRU that identifies the AP for handoff as the AP itself and identifies the post-handoff set of communication parameters as said first set of communication parameters. The AP transceiver is also preferably configured to receive from a WTRU, that is conducting a wireless communication via the AP, a re-association indication message indicating a handoff of the communication to via another AP and the processor is configured to release resources allocated for the communication in connection with receiving the re-association indication message.

For the first and fourth scenarios, the AP is preferably configured to operate in an IEEE 802.11 compliant system wherein the transceiver is configured to use predetermined frame formats. The processor is then preferably configured to direct the transceiver to transmit re-association requests in directed re-association request (DRRq) frames, to receive re-association indications in directed re-association indication (DRI) frames, to receive reconfiguration confirmations in directed re-association confirmation (DRCf) frames and to receive decisions regarding re-association in directed re-association response (DRRsp) frames.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method for use in a wireless transmit/receive unit (WTRU), the method comprising:
    receiving a request message from an Institute of Electrical and Electronics Engineers (IEEE) 802.11 target access point (AP) using a first set of communication parameters;
    determining whether to accept or reject association with the IEEE 802.11 target AP based on the request message;
    transmitting a response message to the IEEE 802.11 target AP using the first set of communication parameters, wherein the response message indicates whether the WTRU accepts or rejects association with the target AP; and
    on a condition the WTRU accepts association with the IEEE 802.11 target AP, reconfiguring to communicate via a second set of communication parameters, and communicating with the IEEE 802.11 target AP using the second set of communication parameters.

2. The method of claim 1, wherein the request message includes: an identifier of the IEEE 802.11 target AP, the second set of communication parameters, and a field that indicates whether disassociation of the WTRU from a source AP is immediate.

3. The method of claim 1, wherein on a condition the WTRU accepts association with the IEEE 802.11 target AP, transmitting a notification message to the source AP using the first set of communication parameters, wherein the notification message indicates whether disassociation of the WTRU from the source AP is immediate.

4. The method of claim 1, wherein the identifier of the target AP is a Basic Service Set Identifier (BSSID).

5. The method of claim 1, wherein the second set of communication parameters includes a channel of the IEEE 802.11 target AP.

6. The method of claim 1, wherein the request message is a management frame.

7. The method of claim 1, wherein the communicating with the target AP is performed using Institute of Electrical and Electronics Engineers (IEEE) 802.11 technology.

8. A wireless transmit/receive unit (WTRU) comprising:
    a transceiver configured to receive a request message from an Institute of Electrical and Electronics Engineers (IEEE) 802.11 target access point (AP) using a first set of communication parameters; and
    a processor configured to determine whether to accept or reject association with the IEEE 802.11 target AP based on the request message;
    wherein the transceiver is further configured to transmit a response message to the IEEE 802.11 target AP using the first set of communication parameters, wherein the response message indicates whether the WTRU accepts or rejects association with the target AP; and
    wherein on a condition that the WTRU accepts association with the IEEE 802.11 target AP, the processor is further configured to communicate via a second set of communication parameters, and the transceiver is further configured to communicate with the IEEE 802.11 target AP using the second set of communication parameters.

9. The WTRU of claim 8, wherein the request message includes: an identifier of the IEEE 802.11 target AP, the second set of communication parameters, and a field that indicates whether disassociation of the WTRU from a source AP is immediate.

10. The WTRU of claim 8, wherein on a condition the WTRU accepts association with the IEEE 802.11 target AP, transmitting a notification message to the source AP using the first set of communication parameters, wherein the notification message indicates whether disassociation of the WTRU from the source AP is immediate.

11. The WTRU of claim 8, wherein the identifier of the IEEE 802.11 target AP is a Basic Service Set Identifier (BSSID).

12. The WTRU of claim 8, wherein the second set of communication parameters includes a channel of the IEEE 802.11 target AP.

13. The WTRU of claim 8, wherein the request message is a management frame.

14. The WTRU of claim 8, wherein the transceiver is configured to communicate with the target AP using Institute of Electrical and Electronics Engineers (IEEE) 802.11 technology.

15. A method for use in an IEEE 802.11 access point (AP), the method comprising:
   sending a request message to a wireless transmit/receive unit (WTRU) using a first set of communication parameters; and
   receiving a response message from the WTRU using the first set of communication parameters, wherein the response message indicates whether the WTRU accepts or rejects association with the AP; and
   on a condition that the WTRU accepts association with the AP, communicating with the WTRU using a second set of communication parameters.

16. The method of claim 15, wherein the request message includes: an identifier of the Institute of Electrical and Electronics Engineers (IEEE) 802.11 AP, the second set of communication parameters, and a field that indicates whether disassociation of the WTRU from a source AP is immediate.

17. The method of claim 15, wherein the identifier of the Institute of Electrical and Electronics Engineers (IEEE) 802.11 AP is a Basic Service Set Identifier (BSSID).

18. The method of claim 16, wherein the second set of communication parameters includes a channel of the IEEE 802.11 AP.

19. The method of claim 15, wherein the request message is a management frame.

20. An Institute of Electrical and Electronics Engineers (IEEE) 802.11 access point (AP) comprising:
   a transceiver configured to send a request message to a wireless transmit/receive unit (WTRU) using a first set of communication parameters and configured to receive a response message from the WTRU using the first set of communication parameters, wherein the response message indicates whether the WTRU accepts or rejects association with the IEEE 802.11 AP; and
   wherein on a condition that the WTRU accepts association with the IEEE 802.11 AP, the transceiver is further configured to communicate with the WTRU using a second set of communication parameters.

21. The IEEE 802.11 AP of claim 20, wherein the request message includes: an identifier of the IEEE 802.11 AP, the second set of communication parameters, and a field that indicates whether disassociation of the WTRU from a source AP is immediate.

22. The IEEE 802.11 AP of claim 20, wherein the identifier of the AP is a Basic Service Set Identifier (BSSID).

23. The IEEE 802.11 AP of claim 20, wherein the second set of communication parameters includes a channel of the AP.

24. The IEEE 802.11 AP of claim 20, wherein the request message is a management frame.

25. The IEEE 802.11 AP of claim 20, wherein the transceiver is configured to communicate with the WTRU using IEEE 802.11 technology.

* * * * *